United States Patent [19]
Loftus et al.

[11] Patent Number: 5,679,126
[45] Date of Patent: Oct. 21, 1997

[54] METHOD FOR COLLECTING FIBERS FROM ROTARY FIBERIZER

[75] Inventors: James E. Loftus; Michael T. Pellegrin, both of Newark, Ohio

[73] Assignee: Owens-Corning Fiberglas Technology, Inc., Summit, Ill.

[21] Appl. No.: 558,104

[22] Filed: Nov. 15, 1995

[51] Int. Cl.⁶ .................. C03B 37/04; D01D 7/00
[52] U.S. Cl. .................. 65/460; 65/438; 65/459; 65/522; 264/8; 264/211.14; 264/DIG. 26; 425/8
[58] Field of Search .................. 65/459, 460, 470, 65/505, 521, 522, 455, 469, 528, 438; 264/211.1, 211.14, DIG. 26, DIG. 28, DIG. 29, 8; 425/8, 131.5, DIG. 217

[56] References Cited

U.S. PATENT DOCUMENTS 2,897,874   8/1959   Stalego et al. .
2,998,620   9/1961   Stalego ....................... 65/470 X
3,161,926   12/1964  Stalego et al. .
3,900,302   8/1975   Langlois et al. .............. 65/521 X

*Primary Examiner*—Melvin Mayes
*Attorney, Agent, or Firm*—C. Michael Gegenheimer; Curtis B. Brueske

[57] ABSTRACT

A method of producing a fibrous product is disclosed. Molten material is introduced into a rotating spinner which includes a peripheral wall having a plurality of orifices. The molten material is centrifuged through the orifices to create fibers. The fibers are directed generally downwardly and away from the spinner. The fibers are intercepted on a folded conveyor so that the fibers are draped over the folded conveyor. The fibers form first and second suspended portions which are oriented generally vertically. The folded conveyor and intercepted fibers are moved away from the spinner. The first and second portions of the suspended fibers are raised to a generally horizontal orientation by unfolding the conveyor, thereby producing a generally planar fibrous product.

11 Claims, 4 Drawing Sheets

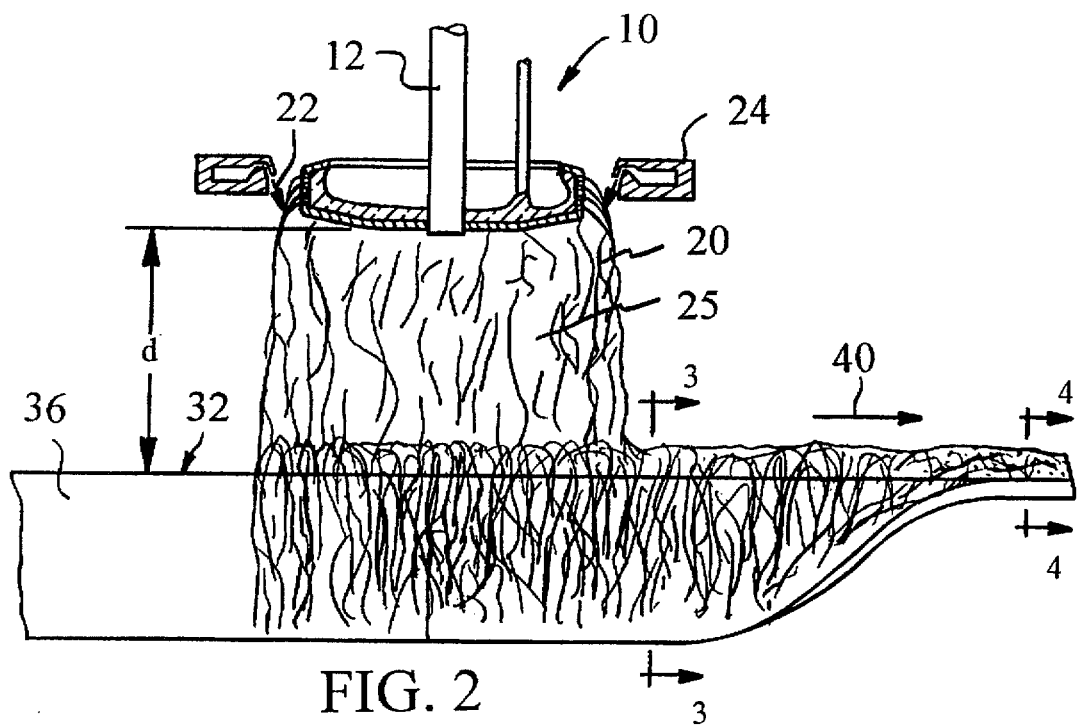
FIG. 2
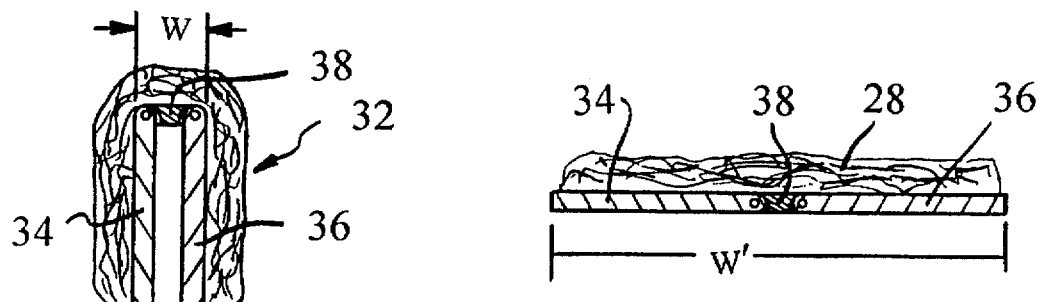
FIG. 3
FIG. 4
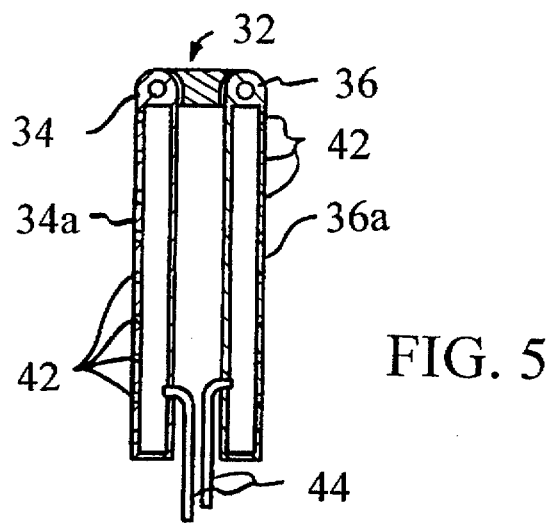
FIG. 5

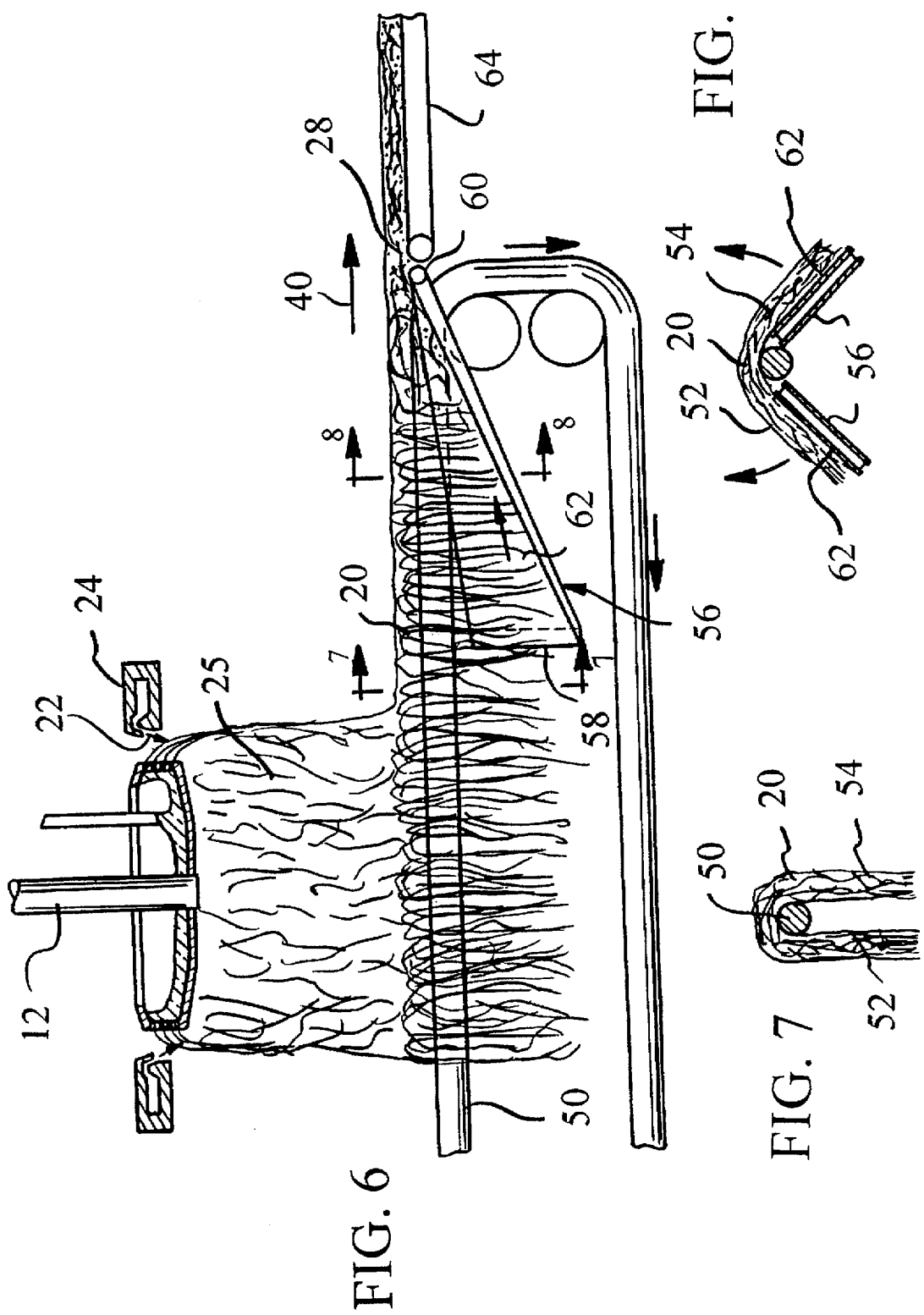

METHOD FOR COLLECTING FIBERS FROM ROTARY FIBERIZER

TECHNICAL FIELD

This invention relates to the forming of fibrous products from generally long fibers. More particularly, the invention relates to a method for collecting fibers centrifuged from a rotary fiberizer.

BACKGROUND ART

Fibrous material which is used typically for acoustical or thermal insulation is commonly formed by a rotary process. Molten material, such as glass, polymer material, slag, rock or basalt, is placed into a rotating spinner having a peripheral wall with orifices. The molten material is centrifuged through the orifices and formed into fibers. The fibers are attenuated and directed downwardly by the action of a flow or blast of gases discharged from an annular blower positioned circumferentially about the spinner. The downwardly moving swirling flow of fibers and gases is referred to as the veil. The fibers can be sprayed with a binder which adhesively binds the fibers together at their contact points, or the fibers can be manufactured without binder. The fibers are then collected to form a fibrous product or blanket.

A typical method of collecting the fibers includes a large hood with suction devices, such as fans, situated underneath. The fibers are collected on a foraminous conveyor positioned above the suction fans so that the suction force draws the fibers onto the conveyor. For the production of long fibers the fibers should be collected within a relatively short distance underneath the spinner, preferably within the range of from about 0.1 m to about 1.5 m. If the fibers are not collected close to the spinner the long fibers tend to bunch together and form generally parallel groupings of fibers, referred to as "ropes". This roping effect is undesirable because of the formation of a non-uniform fibrous product having areas of high density and areas of low density. For the purposes of this specification and claims, the term "long fibers" means fibers that are generally longer than about 10 inches (25 cm) as measured by the drape length method.

Ideally, the long fibers should be collected without suction or with very low amounts of suction to maintain high loft in the fibers. High amounts of suction compress the fibers and reduce the overall recovery thickness of the insulation product. However, if the fibers are collected close to the spinner on a flat foraminous conveyor with low suction, a large amount of fiber material is blown away from the conveyor and is not collected. Also, the use of suction devices is undesirable because of the high levels of noise produced, and because of the expense involved.

Another method of collecting long fibers is to use a direct formed process. The fibers are captured by two opposed conveyor surfaces. The conveyor surfaces are angled downwardly inwardly to collect and consolidate the downwardly moving veil of fibers and convert it into a flattened cross-sectional shape. The gases from the annular blower are suctioned through the conveyor surfaces, which are foraminous. The conveyor surfaces are operated in a downward direction to convey the fibers onto a second conveyor to form the fibrous insulation product. High amounts of suction are used to capture the long fibers and substantially prevent the fibers from being blown away from the conveyor and not collected.

It would be desirable to have a method of forming and collecting long fibers without the use of high suction so as to prevent the undesirable compression of the long fibers, and to produce a fibrous product that is of uniform density.

DISCLOSURE OF THE INVENTION

There has now been invented an improved method of forming and collecting long fibers to produce a generally uniform fibrous product. The method of the present invention for collecting the long fibers includes intercepting the fibers on a narrow collector so that the fibers are draped over both sides of the collector, and then raising the two sides of the draped fibers to form a generally planar blanket after the collector and draped fibers have been removed from the downwardly moving gaseous blast. A narrow collector is one which has a width that is substantially smaller than the diameter of the spinner and the diameter of the corresponding veil. The invention does not require the use of suction devices which can damage the fibers and lower the recovery height of the fibrous product.

Molten material is introduced into a rotating spinner which has a peripheral wall having a plurality of orifices. The molten material is centrifuged through the orifices to create generally long fibers where the fibers are directed generally downwardly away from the spinner. The fibers are intercepted on a collector so that the fibers are draped over the collector. Preferably, the fibers are intercepted at a distance beneath the spinner within the range of from about 0.1 m to about 1.5 m. The intercepted fibers form first and second portions which are suspended over the collector and are oriented generally vertically. The collector and intercepted fibers are then moved away from the spinner. The first and second portions of the suspended fibers are raised to a generally horizontal orientation, thereby producing a generally planar fibrous product. The long fibers are preferably intercepted without the use of suction devices for collecting the fibers, which can damage the recovery height of the fibrous product. Preferably, the long fibers have an average length which exceeds 10 inches. The fibers can be manufactured with or without a binder applied to the fibers. The fibers can also be formed from various materials, such as glass or polymer materials. The spinner can also be adapted to form bi-component fibers which are formed from two different molten materials having different coefficients of thermal expansion which cause the fiber to curl when cooled. Bi-component fibers have high loft and greater entanglement characteristics when compared to conventional straight fibers.

In a specific embodiment of the invention, the fibers are intercepted on a foldable conveyor. The conveyor is directed underneath the spinner in a folded position with the first and second surfaces of the conveyor both oriented generally vertically so that the intercepted fibers are draped over the conveyor. The conveyor and intercepted fibers are then moved away from the spinner. The conveyor is then unfolded so that the first and second surfaces are oriented generally parallel to each other and form a generally horizontal surface, thereby producing a generally planar fibrous product. Preferably, the fibers are intercepted on the conveyor without the use of suction devices. The width of the conveyor in the unfolded orientation is greater than the width of the conveyor in the folded orientation, preferably at least 5 times greater, and more preferably at least 10 times greater.

BRIEF DESCRIPTION OF DRAWINGS

FIG. 2 is a schematic, partially sectioned, elevational view showing the collection of fibers on a foldable conveyor of the present invention.

FIG. 3 is a schematic sectional view taken along lines 3—3 of FIG. 2 showing the conveyor in the folded orientation with the suspended fibers draped over the conveyor.

FIG. 4 is a schematic sectional view taken along lines 4—4 of FIG. 2 showing the conveyor in the unfolded orientation.

FIG. 5 is cross-sectional view of the conveyor similar to that shown in FIG. 2, but having hollowed out portions for suction.

FIG. 6 is a schematic, partially sectioned, elevational view showing an alternate embodiment of intercepting the fibers with a single beam collector and a ramping member.

FIG. 7 is a schematic sectional view taken along lines 7—7 of FIG. 6 showing the fibers collected on the single beam collector.

FIG. 8 is a schematic sectional view taken along lines 8—8 of FIG. 6 showing the ramping member raising the fibers.

BEST MODE FOR CARRYING OUT THE INVENTION

Figure 1:
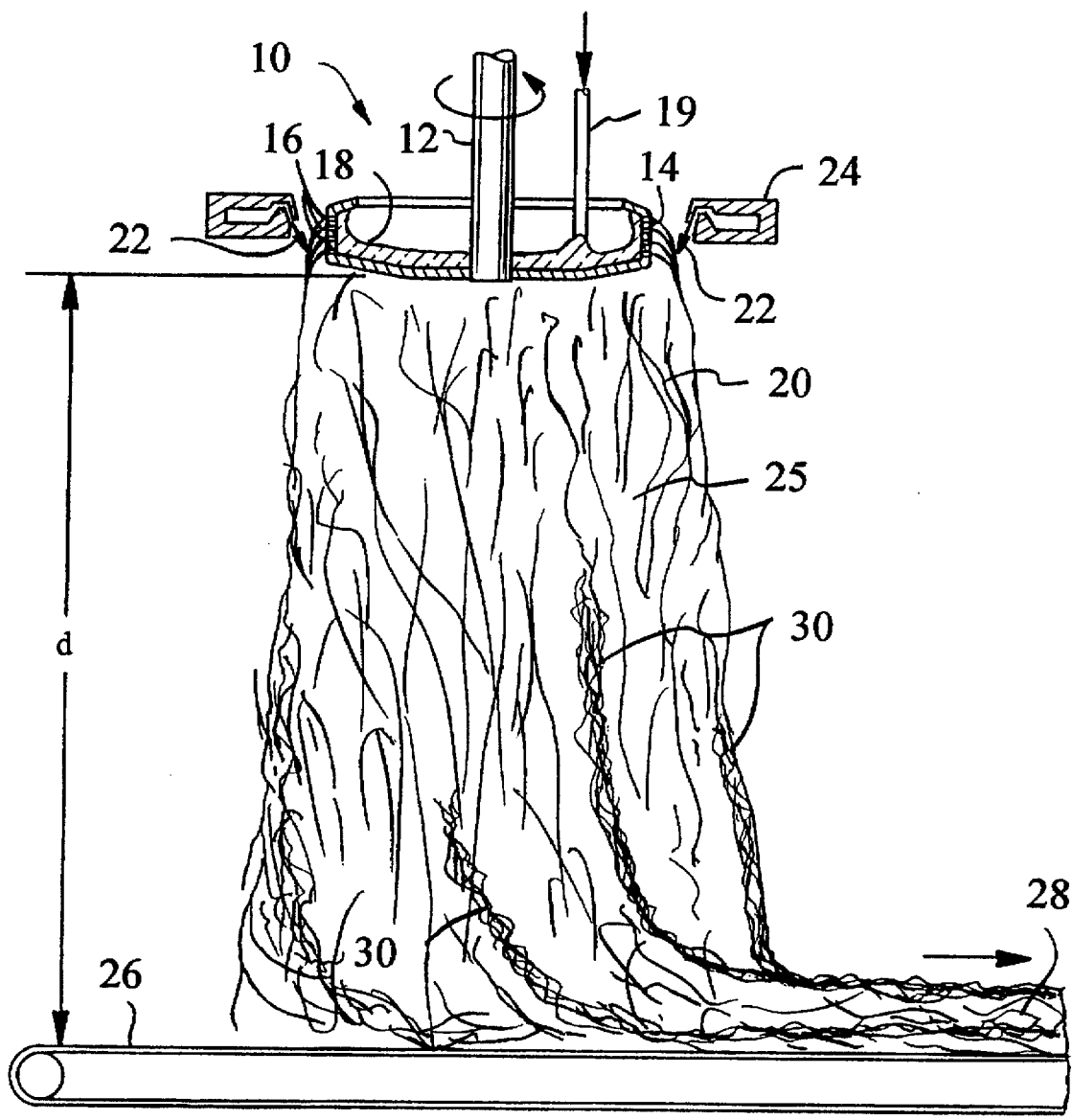
FIG. 1 is a schematic, partially sectioned, elevational view of a fiberizer showing a prior art centrifuging process.

FIG. 1 illustrates a conventional method of forming fibers by the use of a fiberizer, generally indicated at 10. The fiberizer includes a rotating spinner 12 having a peripheral wall 14 with a plurality of orifices 16. Molten material 18 is introduced into the rotating spinner as a stream 19 and is centrifuged through the orifices forming fibers 20. The molten material can be of any material suitable for the formation of fibrous products. The material can be inorganic, such as glass, rock, slag or basalt, or can be organic, such as polymer material. The fibers emanating from the spinner are attenuated and directed downward by the action of a downward flow or blast of gases 22 discharged from an annular blower 24. The blower is positioned circumferentially about the spinner and the gases are discharged from the blower at high velocity to turn the direction of the fibers downward, and in some cases to further attenuate the fibers. The gaseous blast forms a veil 25 which is a generally downwardly moving column of swirling gases and fibers.

In a conventional process, the fibers are collected or intercepted on a flat foraminous conveyor surface 26 to form a continuous fibrous product, or blanket 28. It should be understood that the rotary fiberizer method of forming fibers can be used to form products other than a fibrous blanket, such as reinforced products. Of course, multiple fiberizers can be used in cooperation with each other to form a single fibrous blanket. The veil is typically drawn towards the foraminous conveyor by a strong suction force which can be created by various suction devices (not shown), such as a fan. Without suction, a substantial portion of the fibers would deflect or bounce off the conveyor surface and not be collected.

By controlling the speed of the rotating spinner, the velocity of the gaseous blast from the blower, and the distance from the blower to the spinner, and other factors controlling the fiber forming environment, the length of the fibers can be altered to form relatively short or long fibers. Preferably, the long fibers are bi-component fibers. Bi-component fibers are formed from two different types of molten material, each having different coefficients of thermal expansion so that the fiber curls when cooled. Long fibers, however, tend to bunch together in the veil before being collected. The long fibers sporadically form generally parallel groupings of fibers, referred to as ropes 30. This roping effect is undesirable because of the formation of a non-uniform fibrous blanket which has areas of high density and low insulating qualities, as well as unpleasant aesthetics. The farther the fibers are collected away from the from the spinner, the more likely roping will occur. The distance from the spinner 12 to the collection surface 26 is indicated in FIG. 1 as distance "d". For shorter distances d, the suction force is increased to draw the fibers onto the conveyor surface before they are deflected off. However, high amounts of suction compress the fibers and reduce the overall recovery thickness of the fibrous blanket.

For the purposes of this specification and claims, the term "long fibers" means fibers that are generally longer than about 10 inches (25 cm) as measured by the drape length method. The drape length method measures fiber length by measuring the length of fibers collected on a narrow collecting rod, typically 0.25 inch (0.64 cm) in diameter. The rod is moved horizontally with a smooth and swift motion through the entire veil, thereby capturing or collecting fibers on the rod. The rod should be moved through the veil near the spinner to avoid "roped" collections of fibers. The distance from the spinner depends upon various factors, such as, the molten material being fiberized and the spinner diameter. For a 15 inch (38 cm) spinner for fiberglass, the rod is preferably at a distance of about 9 inches (23 cm) from the spinner bottom. The suspended fibers will span across the length of the rod at a distance approximately equal to the veil diameter.

Figure 9:
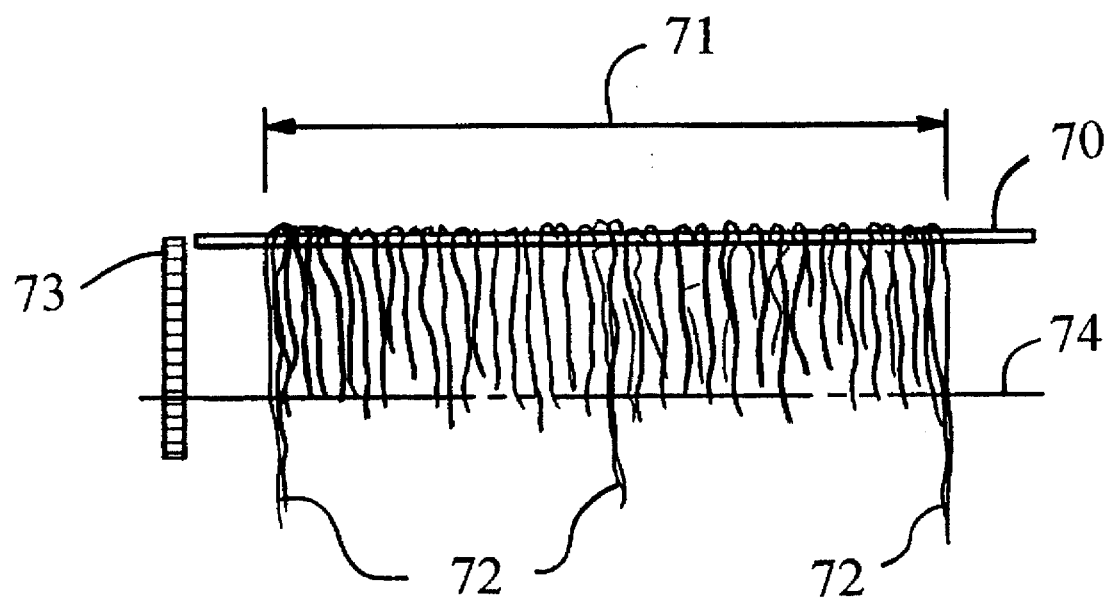
FIG. 9 is schematic representation of suspended fibers collected on a rod using the drape length method for measuring fiber lengths.

FIG. 9 illustrates a typical collection of fibers suspended from a collection rod 70 used in the drape length method, where 71 is the approximate width of the veil. With the rod held level, the average fiber drape length is measured by placing a tape measure 73, or other measuring device, next to the rod and the general appearance of the average length of the suspended fibers by sight is recorded. The general appearance of the average length is represented by line 74 in FIG. 9. Regions 72 on the rod that are clearly inconsistent with the rest of the fiber lengths collected on the rod are neglected. These inconsistent regions are typically at the ends of the span of collected fibers where the rod travels through a larger multitude of fibers in the veil. The procedure can be repeated with a cleaned rod, especially if the fiber drape lengths are difficult to read. If multiple readings are taken, the readings are then averaged to determine the fiber drape length.

FIGS. 2 and 3 illustrate a preferred embodiment of the present invention using the same type of fiberizer 10, but with the long fibers being collected near the spinner 12 on a narrow collector, such as a foldable conveyor 32. The conveyor 32 has first and second surfaces, such as flaps 34 and 36 which are pivotally attached to the conveyor. The flaps are attached at a central portion 38 of the conveyor.

The section of the conveyor which is underneath the spinner has the flaps 34 and 36 oriented generally vertically, and the section of the conveyor is said to be in a folded position. The long fibers 20 move downward from the spinner and are collected by the conveyor by being draped over the central portion 38 of the conveyor. The collection of draped or suspended long fibers has an inverted U-shaped cross-section, as seen in FIG. 3. The fibers are not deflected or blown off the conveyor because most of the high velocity discharged gases from the blower 24 are directed around the conveyor flaps while the long fibers are caught or collected on the central portion 38. Although a portion of the fibers will not be collected, the majority of the fibers will form into a collection or mass by their own entanglement and will drape over the conveyor.

Because the gases of the downwardly moving gaseous blast are directed around the conveyor, the central portion 38 of the conveyor can be positioned substantially closer to the spinner than a flat collector could be. The conveyor of the present invention can be used without suction devices, or used with low amounts of suction to help reduce the amount of deflected fibers. Since high suction compresses and breaks the long fibers, the recovery height of the fibers collected by the present invention is not greatly affected due to the absence of high suction. Because of the ability to collect the long fibers near the spinner, the formation of bunched groupings of long fibers or ropes is greatly reduced. Preferably, the distance d is within the range of from about 0.1 m to about 1.5 m.

As the conveyor moves in a direction 40 away from the veil and the downwardly moving gaseous blast, the conveyor unfolds so that the flaps 34 and 36 are oriented generally parallel to each other so that they form a generally horizontal plane or surface, as can be seen from FIG. 4. The flaps lift the draped or suspended long fibers and orient them to form a generally planar fibrous blanket. If desired, the continuous fibrous blanket can then be cut on the edges for a consistent and uniform width. The conveyor flaps can be lifted up in any suitable manner such as by traveling on a ramp (not shown) or lifted by armatures (not shown). The conveyor can be any sufficient surface which can be folded and unfolded, such as a plurality of hinged sections, wire mesh, nylon webbing or a covering of flexible material.

As seen in FIGS. 3 and 4, the horizontal width W of the conveyor in its folded position is sufficiently shorter than the horizontal width W' of the conveyor in its unfolded position. The unfolded width W' of the conveyor is preferably greater than about 5 times the width W of the conveyor in the folded orientation so that the gaseous blast can be directed around the flaps. The closer the widths W and W' are to each other, the more the foldable conveyor performs like a conventional flat conveyor having the problems of fiber deflection.

FIG. 5 illustrates an embodiment of the conveyor 32 which is adapted to provide for low suction to draw the fibers onto the conveyor. The flaps 34 and 36 are hollowed out with a plurality of orifices 42 in outside surfaces 34a and 36a of the flaps, respectively. Tubing 44 communicates with the hollowed out portion of the flaps and a suction device (not shown) to provide for suction to draw stray fibers onto the outside surfaces of the flaps. A low amount of suction force is preferable to maintain the high loft in the fibers. High suction will damage the fibers and reduce the overall recovery thickness.

Although the narrow collector has been described as a foldable conveyor, the collector can be any sufficient collecting surface which is narrow enough to allow passage of most of the discharged gases. FIG. 6 illustrates another embodiment of the invention in which the narrow collector is a single beam, schematically shown as 50. The beam can be of any suitable material or shape which is narrow enough to intercept the long fibers and allow the blast of gases 22 to flow around it. The beam moves in the direction 40 away from the gaseous blast and collects the long fibers 20 in the same manner as collector 32 by intercepting the long fibers so that the long fibers drape over the beam. As shown in FIG. 7, the suspended fibers form first and second portions 52 and 54 which are oriented generally vertically. The beam carrying the fibers then travels in the direction 40 away from the gaseous blast and veil, and between two opposed ramped members, illustrated as ramp conveyors 56.

The ramp conveyors have an end 58 which is positioned generally vertically, and an opposing end 60 which is positioned generally horizontally. The ramp conveyor has a surface 62 which extends from the vertical end 58 to the horizontal end 60 in a twisted configuration. The resulting shape of the surface 62 is much like a flat sheet which has one end twisted or turned 90 degrees with respect to the other end. The surface 62 of the ramp conveyor is moving in the direction 40 at approximately the same speed as the beam. As the beam moves between the ramp conveyors, the first and second fiber portions 52 and 54 contact their respective ramp surfaces 62 at the vertical end 58 of the ramp conveyors 56. The fiber portions are then propelled in the direction 40 by the ramp conveyor and the beam, and simultaneously raised upward by the rising surface of the ramp conveyor, as can be seen in FIG. 8. Eventually, the beam is directed away from the fibers and the first and second portions are lying solely on the surfaces of their respective ramp conveyors. When the first and second portions 52 and 54 of the fibers are lying on the horizontal end of the conveyor, the portions are oriented in a generally horizontal position, thereby forming a generally planar fibrous blanket 28. The continuously forming blanket is transported away by a take away conveyor 64.

It can be advantageous to have the collector be separate from the ramping member because the collector intercepts the fibers in the harsh environment of the veil. The embodiment with conveyor 32, as shown in FIG. 2, combines the functions of the collector and the ramp into one structure. The collector is preferably constructed from durable materials because the gases and fibers can be at very high temperatures. However, the ramp member, such as the ramp conveyors 56 which are separated from the single beam collector 50, is not subjected to the harsh veil environment and can be constructed from conventional, less durable materials. Also, cleaning of the collector 32 may be required after each pass through the veil, whereas the ramp conveyors 56 may not require cleaning as frequently.

Although the ramp member is illustrated as ramp conveyors 56, the ramp member can be any apparatus which is suitable for raising the first and second fiber portions 52 and 54 to a horizontal orientation. For example, stationary ramps (not shown) could be used. The stationary ramps would be shaped similar to ramp conveyors 56 in a twisted-like configuration. The surface of the stationary ramps could be made out of low frictional material or adapted with air assisting features to minimize the frictional dragging force. Vents on the surface of the stationary conveyor could provide for a cushion of air for the forwardly moving fibers to travel upon. The vents could even be shaped so as to direct the air in the forward direction 40 to assist in moving the fibers.

It is to be understood that the first and second portions of the blanket can remain folded, and can be removed from the collector, and packaged in a folded manner, whereby the end user unfolds the blanket for installation.

It will be evident from the foregoing that various modifications can be made to this invention. Such, however, are considered as being within the scope of the invention.

INDUSTRIAL APPLICABILITY

The invention can be useful in the manufacturing of fibrous insulation and filtration products.

We claim:

1. A method of producing a fibrous product comprising:
   a. introducing molten material into a rotating spinner, the spinner having a peripheral wall which has a plurality of orifices;

b. centrifuging the molten material through the orifices to create fibers;

c. directing the fibers away from the spinner with a downwardly moving gaseous blast which creates a downwardly moving veil comprised of gases and fibers;

d. intercepting the fibers on a conveyor, the conveyor being in a folded position under the spinner so that the conveyor has first and second surfaces which are both oriented generally vertically so that the intercepted fibers are draped over the conveyor;

e. moving the conveyor and intercepted fibers away from the veil; and f. unfolding the conveyor so that the first and second surfaces are oriented generally parallel to each other and form a generally horizontal surface, thereby producing a generally planar fibrous product.

2. The method of claim 1 in which the fibers are intercepted without suction devices.

3. The method of claim 1 in which the width of the conveyor in the unfolded orientation is at least about 5 times the width of the conveyor in the folded orientation.

4. The method of claim 1 in which the fibers are comprised of glass fibers.

5. The method of claim 4 in which the glass fibers are comprised of binderless bi-component glass fibers.

6. The method of claim 1 in which the fibers are comprised of polymer fibers.

7. The method of claim 1 in which the fibers are intercepted at a distance beneath the spinner within the range of from about 0.1 m to about 1.5 m.

8. The method of claim 1 in which the conveyor is adapted to provide for suction to draw the fibers onto the conveyor.

9. A method of producing a fibrous product comprising:

a. introducing molten material into a rotating spinner, the spinner having a peripheral wall which has a plurality of orifices;

b. centrifuging the molten material through the orifices to create fibers;

c. directing the fibers away from the spinner with a downwardly moving gaseous blast which creates a downwardly moving veil comprised of gases and fibers;

d. intercepting the fibers on a conveyor positioned at a distance beneath the spinner within the range of from about 0.1 m to about 1.5 m, the conveyor being in a folded position under the spinner so that the conveyor has first and second surfaces which are both oriented generally vertically so that the intercepted fibers are draped over the conveyor, the fibers being intercepted on the conveyor without the use of suction devices;

e. moving the conveyor and intercepted fibers away from the veil; and f. unfolding the conveyor so that the first and second surfaces are oriented generally parallel to each other and form a generally horizontal surface, thereby producing a generally planar fibrous product.

10. The method of claim 9 in which the fibers are comprised of glass fibers.

11. The method of claim 9 in which the fibers are comprised of polymer fibers.

* * * * *